(12) United States Patent
Foster

(10) Patent No.: US 7,526,528 B2
(45) Date of Patent: Apr. 28, 2009

(54) NETWORK ACCESS ARRANGEMENT

(75) Inventor: Robert Al Foster, Colchester (GB)

(73) Assignee: British Telecommunications PLC, London (GB)

( * ) Notice: Subject to any disclaimer, the term of this patent is extended or adjusted under 35 U.S.C. 154(b) by 1135 days.

(21) Appl. No.: 10/220,496

(22) PCT Filed: Mar. 6, 2001

(86) PCT No.: PCT/GB01/00981

§ 371 (c)(1),
(2), (4) Date: Aug. 30, 2002

(87) PCT Pub. No.: WO01/73601

PCT Pub. Date: Oct. 4, 2001

(65) Prior Publication Data

US 2003/0023729 A1 Jan. 30, 2003

(30) Foreign Application Priority Data

Mar. 24, 2000 (EP) .................................. 00302415

(51) Int. Cl.
*G06F 15/16* (2006.01)
(52) U.S. Cl. ...................................... 709/217; 709/229
(58) Field of Classification Search ................ 709/217, 709/227–228, 245, 226, 229
See application file for complete search history.

(56) References Cited

U.S. PATENT DOCUMENTS

| 6,023,464 | A | * | 2/2000 | Woundy ..................... 370/352 |
|---|---|---|---|---|
| 6,195,694 | B1 | | 2/2001 | Chen et al. |
| 6,226,677 | B1 | | 5/2001 | Slemmer |
| 6,237,040 | B1 | * | 5/2001 | Tada ........................... 709/246 |
| 6,370,587 | B1 | * | 4/2002 | Hasegawa et al. ........... 709/245 |
| 6,377,990 | B1 | * | 4/2002 | Slemmer et al. ............ 709/225 |
| 6,397,246 | B1 | * | 5/2002 | Wolfe .......................... 709/217 |
| 6,584,497 | B1 | * | 6/2003 | Case et al. ................... 709/217 |
| 6,732,178 | B1 | * | 5/2004 | Van Horne et al. .......... 709/227 |
| 6,769,025 | B1 | * | 7/2004 | Alles et al. ................... 709/225 |
| 6,775,687 | B1 | * | 8/2004 | Binding et al. .............. 709/203 |

(Continued)

FOREIGN PATENT DOCUMENTS

WO        98/40826  A     9/1998

OTHER PUBLICATIONS

International Search Report dated Oct. 29, 2001, re PCT/GB01/00981.

(Continued)

*Primary Examiner*—Salad Abdullahi
(74) *Attorney, Agent, or Firm*—Nixon & Vanderhye PC

(57) ABSTRACT

A network access arrangement must allocate and store a network address to a client computer. The network access arrangement then monitors file request messages which include an originating network address and compares the originating network address in each request with the stored network address. In the event of a match then instead of returning the requested file, a substituted file is returned to the client. The originating network address is deleted from the network access store such that subsequent file requests are unaffected. Thus, instead of client computer user first receiving the default file requested, a file substituted by the operator of the network access arrangement is received. This substituted file can, for example, contain a variety of information of utility to the user, including news, service information and advertisements.

11 Claims, 4 Drawing Sheets

U.S. PATENT DOCUMENTS

| | | | |
|---|---|---|---|
| 6,895,425 B1* | 5/2005 | Kadyk et al. | 709/203 |
| 6,912,571 B1* | 6/2005 | Serena | 709/224 |
| 2002/0002615 A1* | 1/2002 | Bhagavath et al. | 709/227 |
| 2005/0256958 A1* | 11/2005 | Wilson | 709/227 |

OTHER PUBLICATIONS

International Preliminary Examination Report dated Jan. 8, 2002, re PCT/GB01/00981.

* cited by examiner

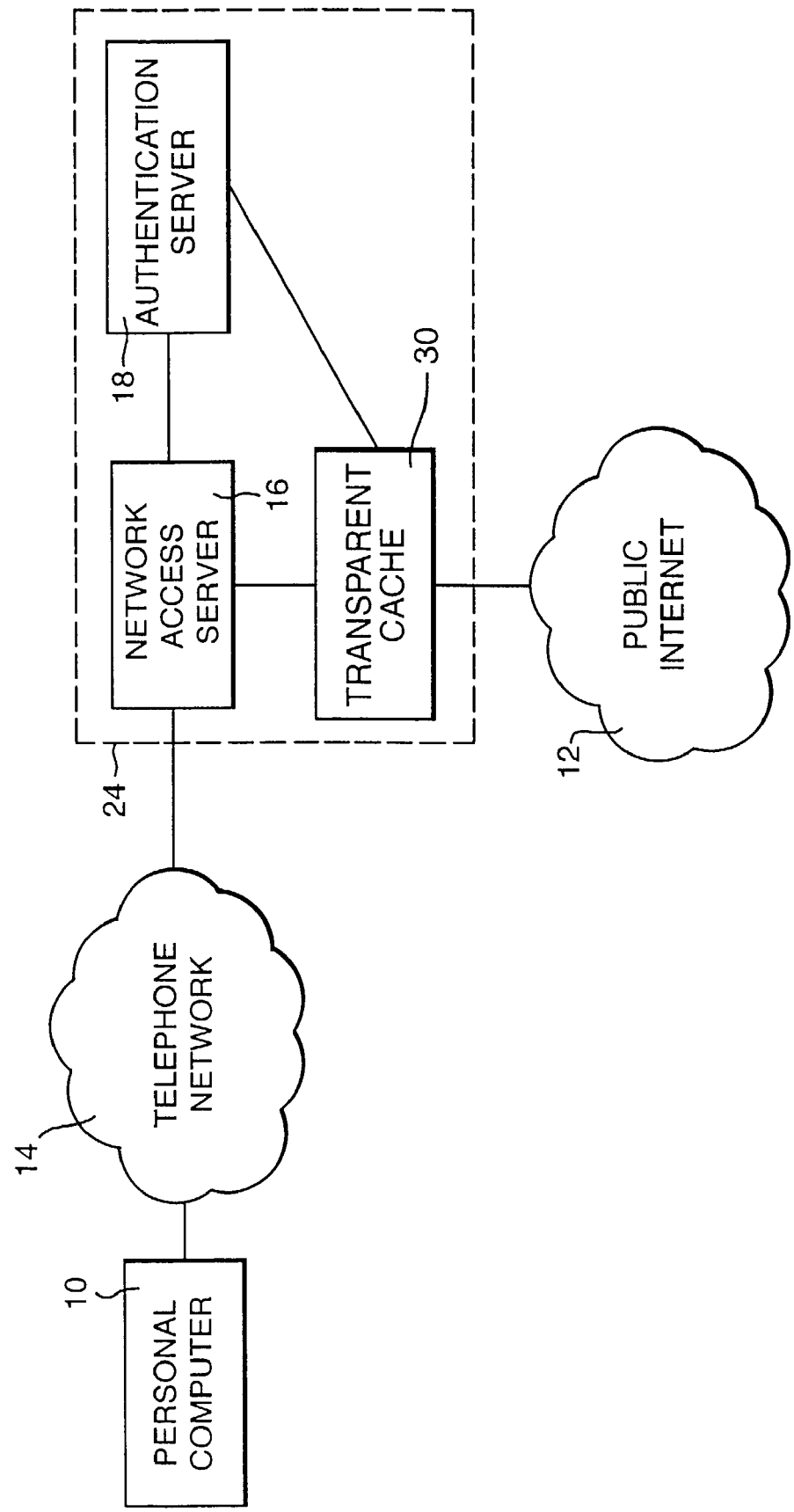

NETWORK ACCESS ARRANGEMENT

This application is the US national phase of international application PCT/GB01/00981 filed 6 Mar. 2001 which designated the U.S.

BACKGROUND

1. Technical Field

This invention relates to both a network access arrangement and a method of operating such a network access arrangement.

2. Related Art

The most widespread data network in use at present is the well-known public Internet. A client computer such as a personal computer may be connected to the public Internet by a dial-up connection through the public telephone network to an Internet network access server. Alternatively, where a personal computer is connected to a local area network, it may be connected to the public Internet by an access server connected to the local area network.

As will be well known, the Internet utilises protocols such as Transmission Control Protocol/Internet Protocol (TCP/IP). Higher level applications such as the World Wide Web (WWW or simply Web), running over the Internet, utilise higher level protocols such as HyperText Transport Protocol (HTTP). The Web has now become a vastly distributed hypermedia information system, comprising of a huge number of information pages, typically created in the HyperText Markup Language (HTML).

After obtaining a connection to the public Internet, a personal computer is usually configured to issue an HTTP request for a particular HTML home page from a Web server. The identity of the requested home page may either be a default setting in the browser used in the personal computer or set by the user of the personal computer. However, the owner (or otherwise operator) of the network access apparatus may prefer that the first home page seen by the user of the personal computer is a home page provided by the owner of the network access apparatus.

BRIEF SUMMARY

According to one aspect of this invention, there is provided a method of operating a network access arrangement, said arrangement being connected between at least one client and a network; said method comprising: receiving a request from a client for connection to said network; allocating a network address to said connection requesting client in response to said connection request; storing said newly allocated network address in a store of such newly allocated network addresses; receiving a request from a client for a file stored in said network; said file request including an originating network address; comparing said originating network address with the contents of said store; and in the event that said originating network address is present in said store, returning a substituted file to said file requesting client in place of said requested file and deleting said originating network address from said store.

Advantageously, in this way, instead of the user of the client computer first receiving the default file requested, a file substituted by the operator of the network access arrangement is received. This substituted file can, for example, contain a variety of information of utility to the user, including news, service information and advertisements.

Where the files of concern are hypermedia documents, preferably the substituted file includes a hyperlink to the default requested file. Alternatively, the requested file is returned to the client after a predetermined period of time.

According to a second aspect of this invention, there is provided a network access arrangement connected between at least one client and a network, said arrangement comprising: means arranged to receive a request from a client for connection to said network; means arranged to allocate a network address to said connection requesting client in response to said connection request; a store for storing said newly allocated network address; means arranged to receive a request from a client for a file stored in said network; said file request including an originating network address; means arranged to compare said originating network address with the contents of said store; and means arranged to return a substituted file to said file requesting client in place of said requested file and to delete said originating network address from said store in the event that said originating network address is present in said store.

BRIEF DESCRIPTION OF TILE DRAWINGS

This invention will now be described in more detail, by way of example, with reference to the drawings in which:

FIG. 3 is a block diagram illustrating a network access arrangement in accordance with a second embodiment of the invention.

DETAILED DESCRIPTION OF EXEMPLARY EMBODIMENTS

Figure 1:
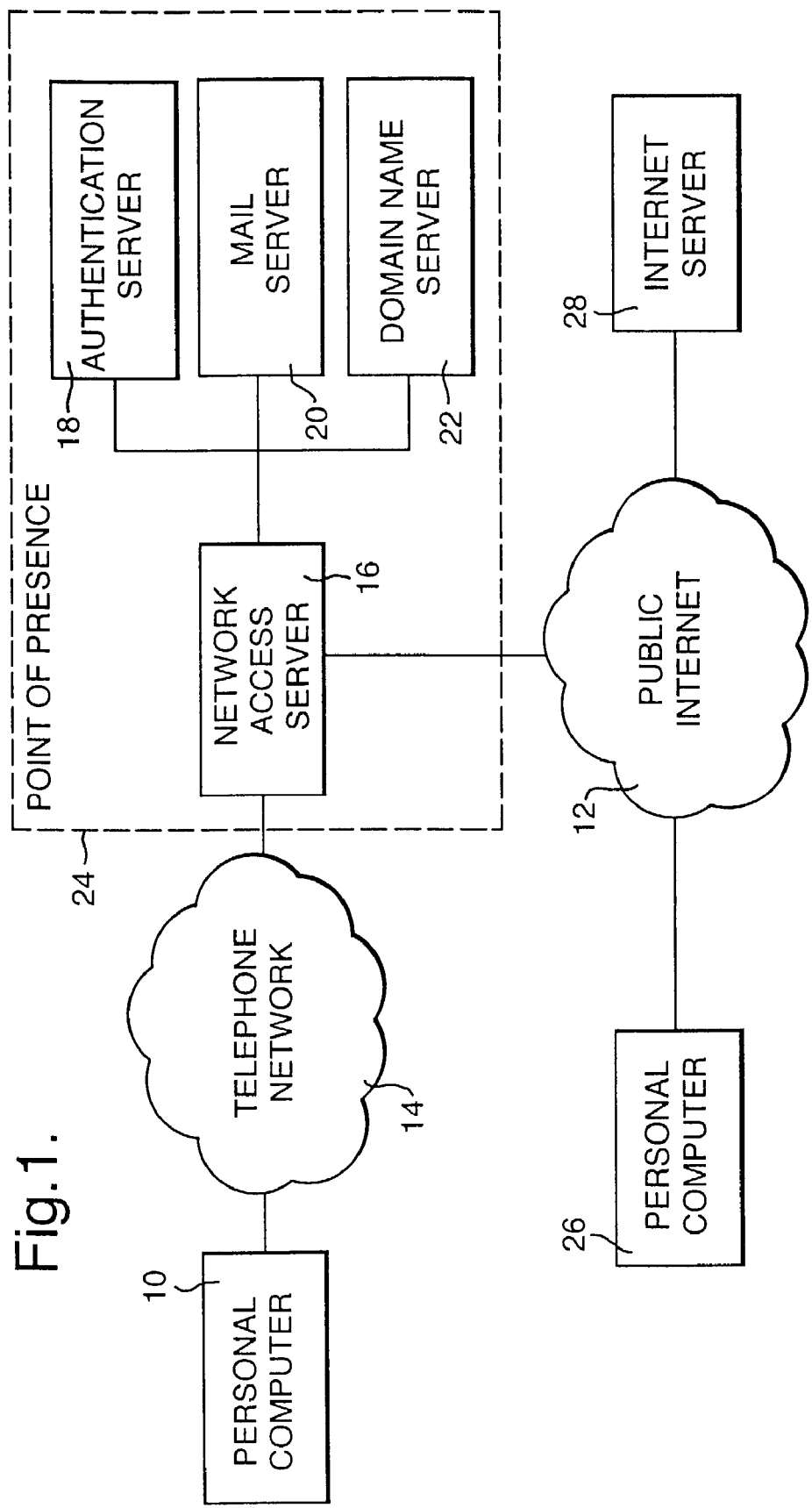
FIG. 1 is a block diagram illustrating a network access arrangement.

Referring now to FIG. 1, there is shown a personal computer 10 which may be connected to the public Internet 12 by a dial-up connection through a public telephone network 14 and an Internet network access server 16. It will be appreciated that one such Internet network access server 16 will typically provide for the connection of a number of such personal computers 10 (not shown). The Internet access server 16 is connected to an authentication server 18, a mail server 20 and a domain name server 22. The network access server 16, the authentication server 18, the mail server 20 and the domain name server 22 form part of an Internet point of presence 24 which is owned by an Internet service provider. By way of illustration, FIG. 1 also shows a personal computer 26 and an Internet server 28 connected to the public Internet 12.

The personal computer 10, the personal computer 26 and each of the servers 16, 18, 20, 22 and 28 is constructed as a conventional computer. Thus, each of these includes an input/output port for connection to a communications channel, a keyboard, a video display unit, a central processing unit and a store in the form of a hard disk, random-access-memory (RAM) and read-only-memory (ROM). Each of these has an operating system and application programs loaded into its store.

The application programs of the personal computer 10 include a communications stack which enables it to send and receive data packets according to the TCP and IP protocols, a program which enables it to request a dial-up connection through the telephone network 14, for example, to the network access server 16, and a browser, such as the well known Netscape Navigator browser, which enables it to retrieve information pages using higher level protocols including HTTP.

In each of the servers 16, 18, 20, 22 and 28, the application programs include a program which provides the server functionality. The network access server 16 has a program which enables it to function as a network access server. Each of the servers 18, 20 and 22 has an application program which provides its specific functionality. The functionality according to the invention is provided by such application software which can be loaded onto network access apparatus in a variety of ways. The software code can be loaded from a computer readable storage medium such as a floppy disk, a CD-ROM, a DVD-ROM or similar. Likewise, the software could be downloaded over, for example, a network.

Although, in the present example, each of the servers 16, 18, 20 and 22 is constructed as an individual computer, two or more of these servers could be provided by a single computer which has appropriate application programs.

As indicated above, when a personal computer, such as a personal computer 10, is connected to the public Internet 12, it can transmit and receive data packets using the well known transmission control protocol (TCP) together with the Internet protocol (IP). A computer, such as the personal computer 10, can thereby retrieve files, including information pages, stored on Internet servers, such as the Internet server 28, using higher level protocols. Several higher level protocols have been established for such retrieval and these include the HyperText Transfer Protocol (HTTP) and the File Transfer Protocol (FTP).

The personal computer 10 can also send an e-mail to a mailbox contained in a mail server and retrieve its own e-mails from the mail server 20 using the well known Simple Message Transfer Protocol (SMTP).

Information pages which are transmitted using HTTP are created with the HTML. In order to identify a particular information page in a particular server, the information page or file is identified by a Uniform Resource Locator (URL). A URL is structured to identify the Internet server where the file is stored and also the directory and file name within that server.

In order to retrieve an HTML information page, the personal computer 10 transmits the URL for this page to the access server 16, which in turn transmits the URL to the domain name server 22. The domain name server 22 translates the name of the Internet server in which the file is stored from the version of the name given in the URL to the Internet Protocol (IP) address of the Internet server. This IP address is then returned to the client application on the personal computer 10. A request for the desired information page is then sent to the server located at that IP address, at which the page is stored. This server then sends the requested page back through the Internet to the personal computer 10.

After a computer, such as the personal computer 10, has been connected to the Internet 12, it transmits an initial request using, for example, HTTP for a particular information page, the so-called "home page". The URL for this particular information page may be the default setting in the browser used in the computer or it may be set by the user of the computer. The requested information page may be the home page of an organisation which provides Internet services. However, the owner (or otherwise operator) of the point of presence 24 may prefer that the first information page displayed on the computer which it has connected to the Internet is its own home page.

Accordingly, a first embodiment according to the invention will now be described, having regard to FIGS. 2A and 2B, wherewith following the detection by the network access server 16 of an initial request for an information page sent by a computer which it has just allowed to be connected to the network, it instead stores the request and transmits its own homepage to the computer.

Figure 2A:
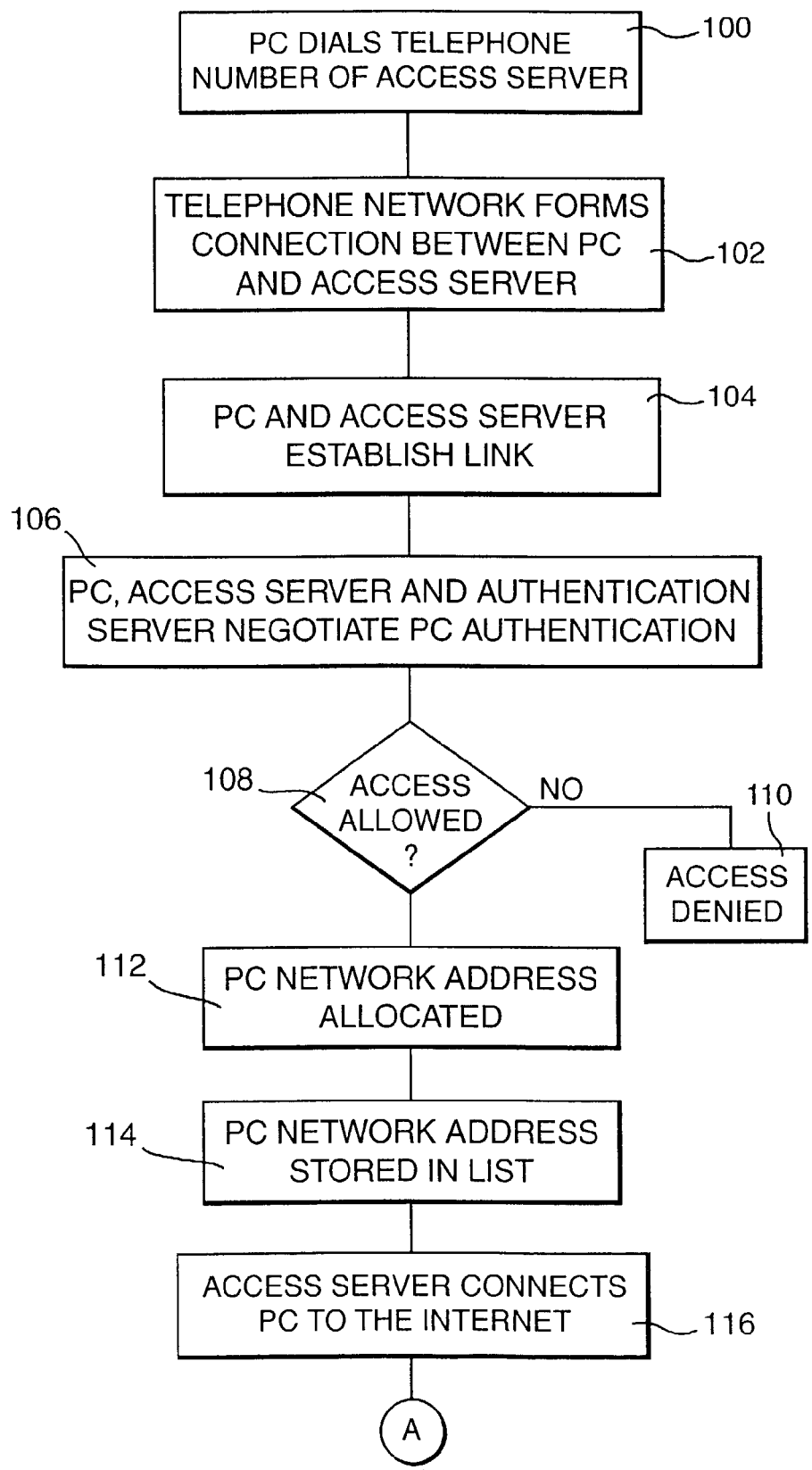
FIGS. 2A and 2B are flow charts illustrating operation of the network access arrangement of FIG. 1 in accordance with a first embodiment of the invention.

It will be appreciated that certain steps of those illustrated in FIG. 2A are conventional, in particular those steps relating to a conventional network access process. Nevertheless, they are discussed for the purposes of making clear their interrelationship with the steps which are not conventional. Referring now to FIG. 2A, in a first conventional step 100, a personal computer 10 dials the telephone number of the network access server 16. Then, in a second conventional step 102, the public telephone network 14 forms a connection between the personal computer 10 and the network access server 16. In a third conventional step 104, the personal computer 10 and the network access server 16 then establish a link, using for example the Point to Point Protocol (PPP).

In a fourth conventional step 106, the network access server 16 then initiates an authentication negotiation with the personal computer 10 to determine whether access is to be allowed or denied. This negotiation may be conducted using, for example, the Password Authentication Protocol (PAP) or the Challenge Handshake Authentication Protocol (CHAP). At the commencement of the negotiation the access server asks for and/or the personal computer 10 transmits, for example, a user identity and a user password. The network access server 16 in turn transmits these details to the authentication server 18.

In fifth conventional step 108, the authentication server 18 then checks whether these authentication details are valid. If the authentication server 18 finds that the authentication details are not valid, then in a sixth conventional step 110 it transmits a message to the network access server 16 to indicate that access is denied. Accordingly the network access server 16 then transmits a message indicating this to the personal computer. If the authentication server 18 finds that the authentication details are valid however, then in a seventh conventional step 112 it transmits a message to the network access server 16 to indicate that access is allowed and a new network address, in this case an IP address, is allocated accordingly. According to this embodiment of the invention in an eighth step 114 this newly allocated IP address is stored in a list along with each other IP address newly allocated in response to the method steps being carried out in respect of different personal computers. If access is allowed, then in a further conventional ninth step 116, the network access server 16 allows connection of the personal computer to the Internet through, for example, provision of the newly allocated IP address.

Figure 2B:
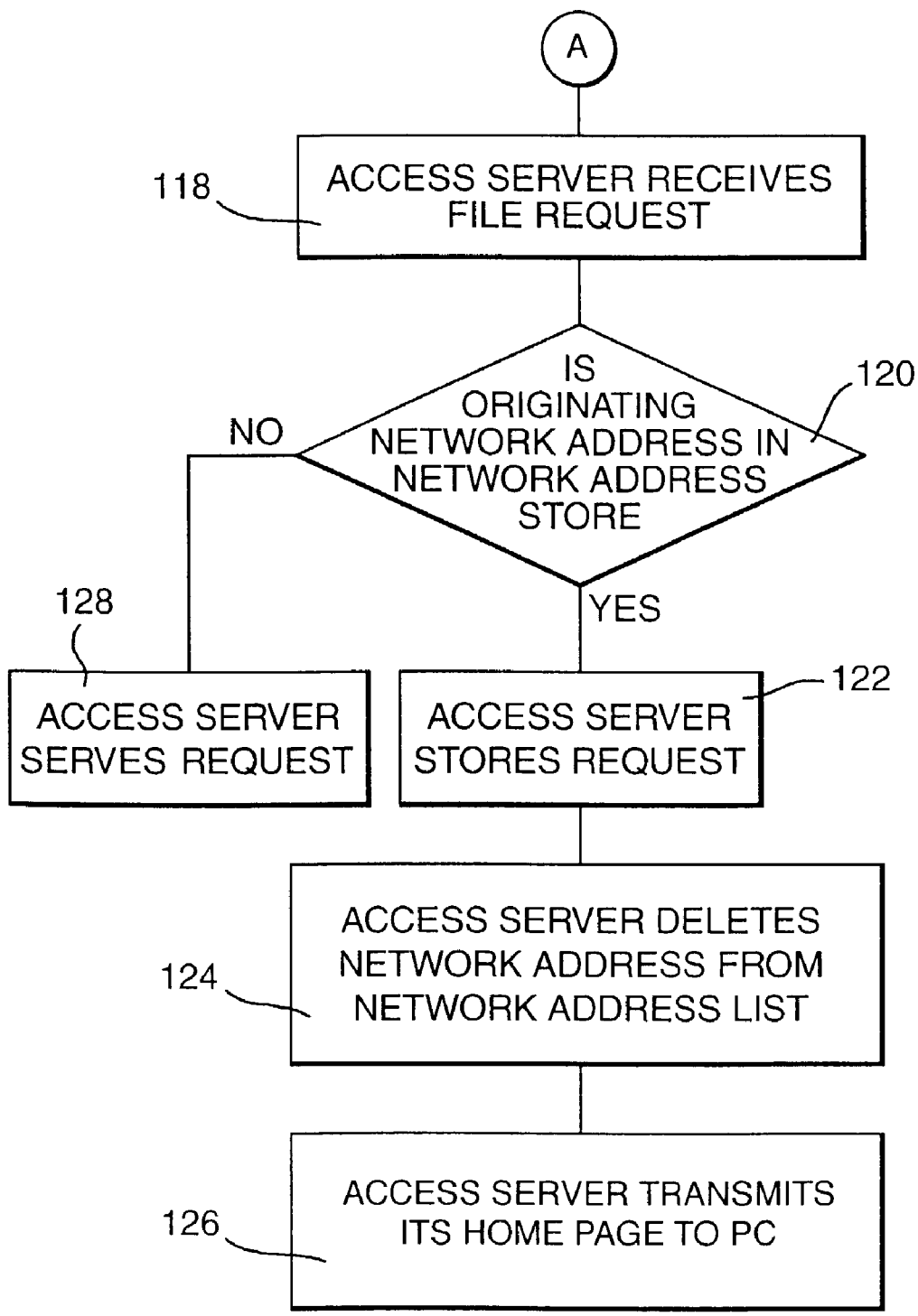

A second stage of operation according to this embodiment of the invention is now illustrated having regard to FIG. 2B. It is to be appreciated that, in operation, the processes of FIGS. 2A and 2B will be carried out concurrently in respect of a number of different client computers. All requests from client computers connected through the network access server 16 for files stored in the network 12 will likewise be received initially by the network access server 16. Accordingly, in a tenth step 118, the network access server 16 receives a file request, in this case a request for an information page, from a client computer. Each such file request will include the respective originating network address of that client computer. In a eleventh step 120, the network access server 16 compares the originating network address of a newly received information page request with the store of newly allocated IP addresses updated in the eighth step 114 above. The purpose of this step is to detect an initial homepage request from a client computer, for example personal computer 10.

Communication in accordance with the Transmission Control Protocol provides for the creation of end points or so-called sockets at the sender and receiver hosts. Each such socket has a socket address consisting of the IP address of the host and a local sixteen bit number denoting a so-called port. The assignment of port numbers to different services is as outlined in Request For Comments (RFC) 1700 of the Internet Engineering TaskForce (IETF). Port number 80 is reserved for HTTP connections. Consequently an initial HTTP request from the personal computer 10 for an information page will have the characteristic that the request message will originate from the IP address allocated to the personal computer 10, which IP address will be present in the list of newly allocated IP addresses, and will be be received on port 80 of the network access server 16.

If the network access server determines that the file request does include an IP address that is on the stored list of newly allocated IP addresses, in an twelfth step 122 it caches that file request. In a thirteenth step 124, that IP address is now deleted from the stored list of newly allocated IP addresses. In a fourteenth step 126 the network access server 16 transmits its own HTML home page to the personal computer.

If the IP address is not on the stored list of newly allocated IP addresses then in a fifteenth step 128, the file request is served as is conventional.

The content of the home page of the network access server 16 is established by the owner (or otherwise operator) of the point of presence 24. It may include, for example, a hypertext link to the information page initially requested by the personal computer. Accordingly the user of the personal computer 10 could click through to the initially requested default page by clicking on this hypertext link. It may also include information established by the owner of the point of presence 24, such as news items and information on various services, and it may also include links to other information pages. It may also include information gathered from the mail server relating to the users email account.

The selection of information and links on the home page can be made dependent on the user identity or the geographical location of the user through determination of appropriate attributes, for example, of the connection between the user's PC 10 and the network access server 16. One such suitable attribute is the user's telephone Calling Line Identifier (CLI), potentially allowing a determination of the geographical location of the user's telephone.

By way of an alternative, the originally requested information page is provided to the personal computer 10 following a predetermined delay period. The delay period could be set by the user.

Following the removal of the allocated IP address from the stored list, as is the case in the thirteenth step 124 above, the user of the personal computer can then transmit and receive messages in a conventional manner.

A second embodiment according to the invention will now be discussed having regard to FIG. 3, making use of a so-called transparent cache. The functionality of network caches in general is well known. A transparent cache is a network cache that, whilst having network traffic flowing through it, is invisible to a browser. In this way the benefits of network caching can be provided without browsers having to be reconfigured. Such transparent caches are available from, for example, Inktomi Inc.

A relatively simple approach is to configure a transparent cache as a router such that internet traffic is directed thereto. This approach has the disadvantage that computational resource has to be provided for the routing operations. Furthermore the transparent cache is rendered a critical element in the network link. A more sophisticated approach involves the use of a Layer 4 switch to direct high level protocol traffic, such as HTTP requests, to the transparent cache. Another approach uses the Web Cache Control Protocol (WCCP), developed by Cisco Systems Inc, again providing for redirection of HTTP requests to a cache. Functionality can be added to transparent caches through the installation of application programs, plug-ins.

Having regard to FIG. 3, in this second embodiment, an arrangement similar to a portion of the Point of Presence arrangement of FIG. 1 is illustrated but further including a transparent cache 30 installed between the network access server 16 and the public internet 12. The authentication server 18 connected to both the network access server 16 and the transparent cache 30, is in this embodiment a RADIUS server (or RADIUS proxy server). The RADIUS protocol is as outlined in IETF RFC 2138.

In this second embodiment, the same authentication process will take place as is outlined in FIG. 2A above. According to this embodiment however, when the RADIUS server has authenticated a new computer, the newly allocated IP address will be included in a RADIUS intermediate accounting packet (sent utilising the User Datagram Protocol (UDP) for example) and will be sent to the transparent cache 30. In this way the list of newly connected IP addresses created through the eighth step 114 referred to in the context of the first embodiment is stored in this embodiment in the transparent cache 30.

HTTP traffic, as discussed above, is selectively passed to the transparent cache. Having regard to FIG. 2B, it is thus the transparent cache 30 which performs the tenth step 118, monitoring traffic which passes through the network access server to the transparent cache for an initial HTTP get request. The transparent cache will therefore receive an initial request for a homepage as an HTTP request (received on port 80 as above) originating from an IP address that is present on the stored list of newly allocated IP addresses.

In this alternative embodiment, the eleventh, twelfth, thirteenth and fourteenth steps 120, 122, 124 and 126 are therefore also performed by the transparent cache. This is to say that, the transparent cache, upon detecting such an initial request for a homepage through finding the originating IP address in the IP address store, will cache that request, delete the IP address from the stored list and send, or cause to be sent, a forced homepage in similar fashion to that outlined above in respect of the previous embodiment.

The additional functionality of the transparent cache as here described is provided through the creation and installation of a suitable application program plug-in in like fashion to that mentioned above.

Whilst the previous two embodiments have depicted the operation of the invention in terms of an initial request for a homepage, other criteria may be used in place of this circumstance in order to include a particular set of network addresses in the network address store. These differing criteria allow, for example, for the return of the substituted file at a different time from the initial request (at, for example, the nth request), following a particular event, or for the selective application of the invention to different classes of connecting client computers (where such differentiation might be reflected, for example, in the respective connection requests, with only a subset of the connected client computers having their network address entered into the store). In this way, the invention may be utilised in such as way as to provide the aforementioned advantages whatever the rules for populating the network address list.

Although the invention has been described with reference to connecting a personal computer to the public Internet 12 through the network access server 16, the invention could also be used for connecting a dumb terminal to the Internet 12. In this specification, the terms "personal computer", "communications terminal" and "client" are to be interpreted as including all such entities capable of being assigned a network address ranging from dumb terminals through "thin clients" up to and including any other computers.

In the examples described above, the personal computer 10 is connected to the Internet 12 through a single network access server in the form of network access server 16. By way of modification, the invention could also be used to connect a computer or other communications terminal to the Internet through a combination of a network access server and a proxy server. In this specification, the term "network access server arrangement" is intended to include an arrangement in which the connection is made between the communications terminal and the Internet or other data network through more than one server.

The well known public Internet is an example of a data network. Although the invention has been described with reference to the public Internet, it could be used with any data network.

What is claimed is:

1. A method of operating a network access apparatus connected between at least one communications terminal and a network, said network access apparatus including a store populated with at least one network address allocated to a communications terminal, said method comprising:
   receiving a request from a communications terminal for a file stored in said network, said file request including an originating network address;
   comparing said originating network address with the contents of said store;
   in the event that said comparing step finds said originating network address in said store, returning a substituted file to said communications terminal in place of said requested file and deleting said originating network address from said store; and
   in the event that said comparing step does not find said originating network address in said store, returning the requested file thereby avoiding continued return of a substituted file.

2. A method as in claim 1, wherein said files are hypermedia documents, further comprising including within said substituted file a hyperlink to said requested file.

3. A method as in claim 1, further comprising returning said requested file to said communications terminal a predetermined period of time after returning said substituted file.

4. A method as in claim 1 further comprising:
   determining at least one attribute associated with the connection between the network access apparatus and said communications terminal; and
   creating at least a portion of said substituted file in dependence upon said attribute.

5. A method of operating a network access arrangement, said arrangement being connected between at least one client and a network; said method comprising:
   receiving a request from a client for connection to said network;
   allocating a network address to said connection requesting client in response to said connection request;
   storing said newly allocated network address in a store of such newly allocated network addresses;
   receiving a request from a client for a file stored in said network; said file request including an originating network address;
   comparing said originating network address with the contents of said store;
   in the event that said comparing step finds said originating network address in said store, returning a substituted file to said file requesting client in place of said requested file and deleting said originating network address from said store; and
   in the event that said comparing step does not find said originating network address in said store, returning the requested file thereby avoiding continued return of a substituted file.

6. A network access apparatus connected between at least one communications terminal and a network, said apparatus comprising:
   a store populated with at least one network address allocated to a communications terminal;
   means arranged to receive a request from a communications terminal for a file stored in said network, said file request including an originating network address;
   means arranged to compare said originating network address with the contents of said store;
   means arranged to return a substituted file to said communications terminal in place of said requested file and to delete said originating network address from said store in the event that said comparison finds said originating network address in said store; and
   means arranged to return the requested file to said communications terminal in the event that said comparison does not find said originating network address in said store thereby avoiding continued return of a substituted file.

7. A network access apparatus as in claim 6, wherein said files are hypermedia documents, further comprising means arranged to include within said substituted file a hyperlink to said requested file.

8. A network access apparatus as in claim 6, further comprising means arranged to return said requested file to said communications terminal a predetermined period of time after returning said substitute file.

9. A network access apparatus as in claim 6, further comprising:
   means arranged to determine at least one attribute associated with the connection between the network access apparatus and said communications terminal; and
   means arranged to create at least a portion of said substituted file in dependence upon said attribute.

10. A network access arrangement connected between at least one client and a network, said arrangement comprising:
    means arranged to receive a request from a client for connection to said network;
    means arranged to allocate a network address to said connection requesting client in response to said connection request;
    a store for storing said newly allocated network address;
    means arranged to receive a request from a client for a file stored in said network; said file request including an originating network address;
    means arranged to compare said originating network address with the contents of said store;
    means arranged to return a substituted file to said file requesting client in place of said requested file and to delete said originating network address from said store in the event that said comparison finds said originating network address in said store; and means arranged to return the requested file to said communications terminal in the event that said comparison does not find said originating network address in said store thereby avoiding continued return of a substituted file.

11. A tangible computer-readable storage medium, said storage medium containing computer-readable code which, when executed by one or more computers performs the method of claim 1.

* * * * *